(No Model.)
T. A. FRAKES & M. G. REINERS.
COMBINED SEED DRILL AND ROLLING CUTTER.
No. 272,228. Patented Feb. 13, 1883.
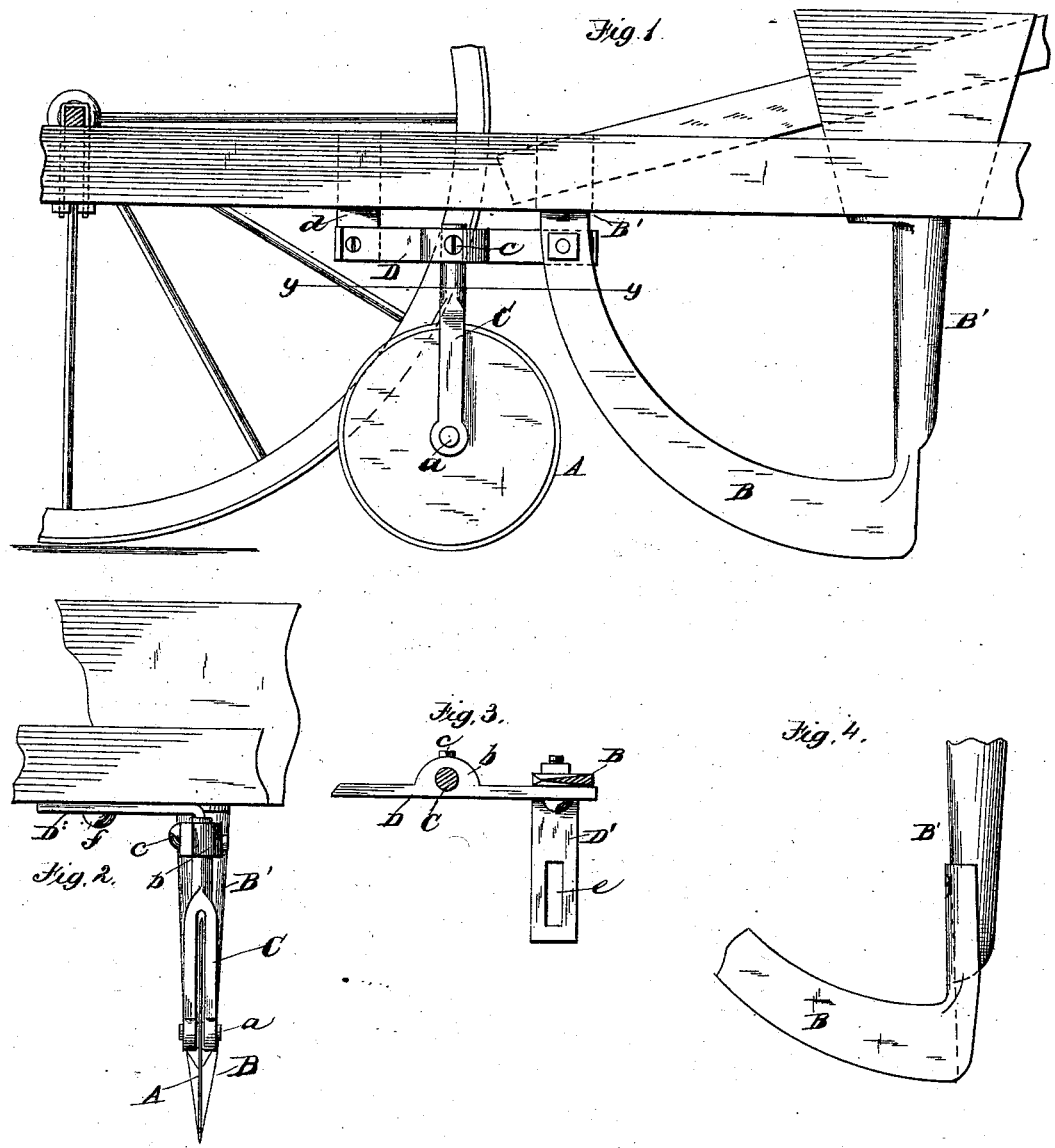

UNITED STATES PATENT OFFICE.

THOMAS A. FRAKES AND MARCUS G. REINERS, OF NEW HOLLAND, ILL.

COMBINED SEED-DRILL AND ROLLING CUTTER.

SPECIFICATION forming part of Letters Patent No. 272,228, dated February 13, 1883.

Application filed June 9, 1882. (No model.)

*To all whom it may concern:*

Be it known that we, THOMAS A. FRAKES and MARCUS G. REINERS, citizens of the United States, residing at New Holland, in the county of Logan and State of Illinois, have invented certain new and useful Improvements in Combined Seed-Drills and Rolling Cutter and Half-Circle Knives; and we do declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 is a side elevation, partly broken away, of our improvement as applied to a grain-drill for use. Figs. 2, 3, and 4 are views in detail thereof, Fig. 3 being taken on line $y$ $y$ of Fig. 1.

This invention relates to improvements in grain-drills, and has special relation to colters therefor, its object being, among other things, to clear away rubbish or obstacles in the path of the drill, to enable planting the seed in the ground without first removing these; and the nature of our invention consists of a colter, preferably of disk or circular form and hung in a standard, which is capable of vertical adjustment, and whose support or bracket is adjustable horizontally, substantially as hereinafter more fully set forth.

In carrying out our invention we employ a colter, A, preferably of disk or circular form, and having its periphery beveled to a cutting-edge. This colter is arranged directly in line with and a short distance in advance of the bevel-edged runner B of the drill B', which drops the seed. This construction of colter and its arrangement enables the cutting and clearing of rubbish or other obstacles in the path of the drill to remove the same out of the way of the planting of the seed. This colter is hung upon an axis, $a$, in a standard, C, capable of vertical adjustment in a bracket or horizontal bar, D, by means of a socket or eye, $b$, in said bar and an adjusting-screw, $c$. This permits the adjustment of the colter to the desired plane of elevation above that of the lower edge of the runner, according to the depth of penetration of the ground by the runner. This enables the colter to move upon the surface of the ground without being caused to unnecessarily penetrate the ground. The horizontal bar of the bracket is connected at one end to the frame of the seed-drill by a depending bar, $d$, pivoted thereto. Its other end is secured to a second horizontal bar, D', arranged at a right angle thereto, and having a slot, $e$, as seen in Fig. 3. This slot admits an adjusting-screw, $f$, (seen in Fig. 2,) which engages a cross-bar of the seed-drill frame, the purpose of which is to allow the lateral or horizontal adjustment of the bracket D D'. One end of the bar D is also connected or bolted to the runner B. This permits the varying the angle of presentation of the colter and runner with its boot or drill, as may be desired.

We claim and desire to secure by Letters Patent—

In a grain-drill, the shoe B, secured to a cross-bar adjustably by means of a slotted angular projection, D', in combination with a bracket, D, pivotally secured to the shoe and to a bracket on a side bar, and provided with a set-screw, $c$, and eye $b$, and with a colter mounted in a bifurcated standard adapted to fit said eye, whereby a lateral turning and adjustment of the colter-standard and a joint simultaneous lateral adjustment of the colter and shoe bodily are secured, substantially as shown and described.

In testimony whereof we affix our signatures in presence of two witnesses.

THOMAS A. FRAKES.
MARCUS G. REINERS

Witnesses:
JONAS WHITE,
JAMES FRAKES.